May 17, 1932. J. B. STOKES 1,858,690
LAWN MOWER
Filed Feb. 25, 1929 2 Sheets-Sheet 1
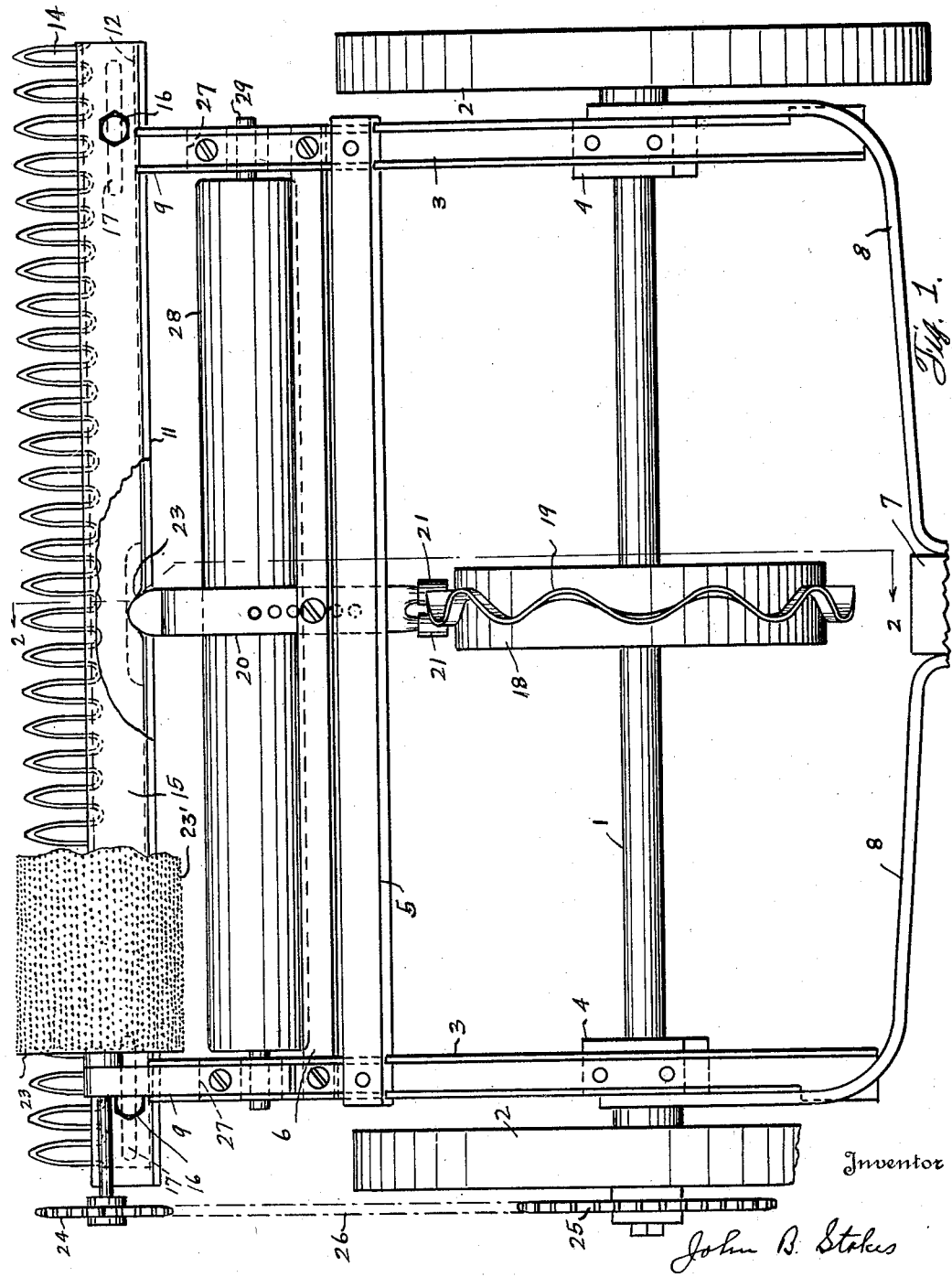

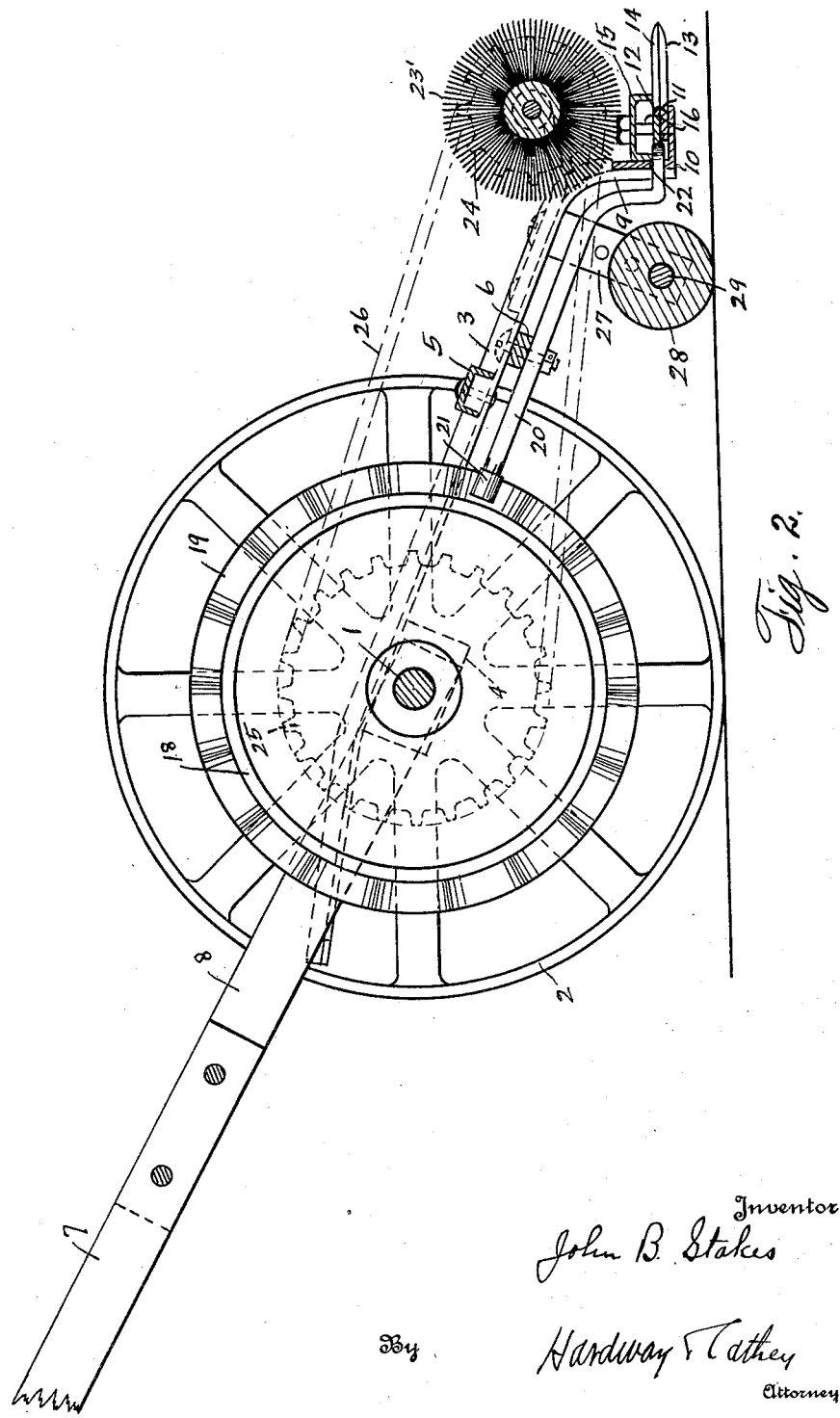

Patented May 17, 1932

1,858,690

UNITED STATES PATENT OFFICE

JOHN B. STOKES, OF HOUSTON, TEXAS

LAWN MOWER

Application filed February 25, 1929. Serial No. 342,504.

This invention relates to new and useful improvements in a lawn mower.

One object of the invention is to provide a mower of the character described equipped with cooperating cutter bars, one of which is reciprocable and novel means for reciprocating said last mentioned cutter bar.

Another object of the invention is to provide a mowing machine of the character described equipped with means for driving a reciprocable cutter bar, said means being adjustable to vary the range of movement of said bar.

A further feature of the invention resides in the provision of a novel arrangement for removing the cut grass to prevent the same from accumulating on the cutter bar.

With the above and other objects in view the invention has particular relation to certain novel features of construction, operation and arrangement of parts, an example of which is given in this specification and illustrated in the accompanying drawings wherein: Figure 1 shows a fragmentary plan view of the machine partly broken away, and Figure 2 shows a cross sectional view taken on the line 2—2 of Figure 1.

Referring now more particularly to the drawings wherein like numerals of reference designate similar parts in each of the figures, the numeral 1 designates a rotatable axle on which the ground wheels 2, 2 are fixed. The numerals 3, 3 designate the side members of the framework which have the bearings 4, 4 on said axle, said side members extending forwardly and being connected by cross brace 5 whose ends are secured to the upper sides of said respective side members, and said framework is further braced by means of the cross bar 6 arranged underneath and whose ends are connected to said respective side members. The numeral 7 designates the handle whose inner or lower end has the strap like arms 8, 8 fastened thereto whose free ends are forwardly curved and provided with bearings in which the axle rotates. The inner ends of the side members 3 extend under said arms 8 and support the same.

The forward ends of the side members 3 are downwardly curved and fixed to said ends there is a transverse cutter bar support 10, formed of angle iron and which has the forwardly extending cutter bar 11 fixed thereto with the reciprocable cutter bar 12 mounted on said fixed cutter bar. These cutter bars have the forwardly extending spaced blades 13, 14 terminating in the lateral sharp edges and pointed forwardly. There is an inverted channel iron forming a housing 15 which is secured to the support 10 by means of suitable bolts as 16 which are fitted through said housing and which secure the fixed cutter bar 11 to the support 10. The reciprocable cutter bar 12 has oblong slots as 17 provided to receive the bolts 16 and to permit the reciprocation of said cutter bar 12. Fixed on the axle 1 there is a cam wheel 18 having a peripheral sinuous double acting cam 19 thereon and pivoted to the bar 6 there is an actuating lever 20. One end of this lever carries the spaced rollers 21, 21, which closely embrace the cam 19 and its other end is downwardly curved and forwardly turned and works through a slot 22 of the support 10 and in the notch 23 in the reciprocable cutter bar and forms means for reciprocating said cutter bar.

The range of movement of the cutter bar 12 may be varied by varying the pitch of the cam 19. This may be best accomplished by removing the cam wheel 19 and substituting another having the desired type of cam 19 thereon.

Rotatably mounted above the housing 15 there is a cylindrical brush 23' on the shaft of which there is fixed a sprocket wheel 24 and there is a sprocket wheel 25 fixed on the end of the axle 1. A sprocket chain 26 operates over these sprocket wheels and transmits rotation from the latter to the former thereby driving the brush in the direction indicated by the arrow of Figure 2, so as to prevent the cut grass from collecting above the cutter bars and housing 15.

Depending from the respective side members 3 are the arms 27, 27 and a ground roller 28 has its shaft 29 working in bearings, in said arms and the cutting bars are thereby supported the required distance above the ground.

As the machine is propelled forwardly the sinuous cam 19 will revolve with the axle and will impart a reciprocatory movement to the actuating lever 20 and to the reciprocable cutter bar and the cooperating cutter bars will shear off the grass to be cut. Meanwhile the brush 23 will be driven to throw the cut grass backwardly out of the way.

While I have shown what I now consider to be the preferred form of the invention it is obvious that mechanical changes may be made therein and equivalents substituted for the parts shown without departing from the principle of the invention.

What I claim is:

1. A lawn mower including a rotatable axle, ground wheels fixed thereon, a frame work having side members provided with bearings on said axle, said side members extending forwardly, a transverse cross bar secured to said side members at the forward ends of said side members, a transverse cutter bar support attached to said ends, a cutter bar fixed to said support, a reciprocable cutter bar mounted on the fixed cutter bar and having oblong slots, said cutter bars having forwardly extending spaced blades, an inverted channel iron forming a housing above said cutter bars and secured to said support, bolts for securing said housing and fixed cutter bar to said support, said bolts passing through said slots, a cam wheel fixed on said axle, having a peripheral double acting cam, said reciprocable cutter bar having a bearing notch, an actuating lever pivoted to said cross bar, one end of which works in said notch and spaced bearings carried by the other end of said lever between which said cam works.

2. A lawn mower including a rotatable axle, ground wheels fixed thereon, a frame having side members pivoted on the axle, said side members extending forwardly and rearwardly from the axle and having their rear ends free, a transverse support on the forward end of the frame, a transverse fixed cutter bar and a reciprocable cutter bar both mounted on the support and having cooperating blades, a housing, bolts securing said housing and fixed cutter bar to said support, said reciprocable bar having slots through which said bolts pass, means for driving the reciprocable cutter bar from the axle, a handle having diverging arms whose free ends have bearings on the axle, the rear ends of said side members extending under said arms whereby the handle may be permitted to swing forwardly onto the frame and whereby the forward end of the frame may be elevated by the rearward and downward movement of the handle.

In testimony whereof I have signed my name to this specification.

JOHN B. STOKES.